March 14, 1933.  B. P. JOHNSON  1,901,300
DOUBLE RUN FORCE FEED GRAIN DISTRIBUTOR
Original Filed Feb. 6, 1932  2 Sheets-Sheet 1
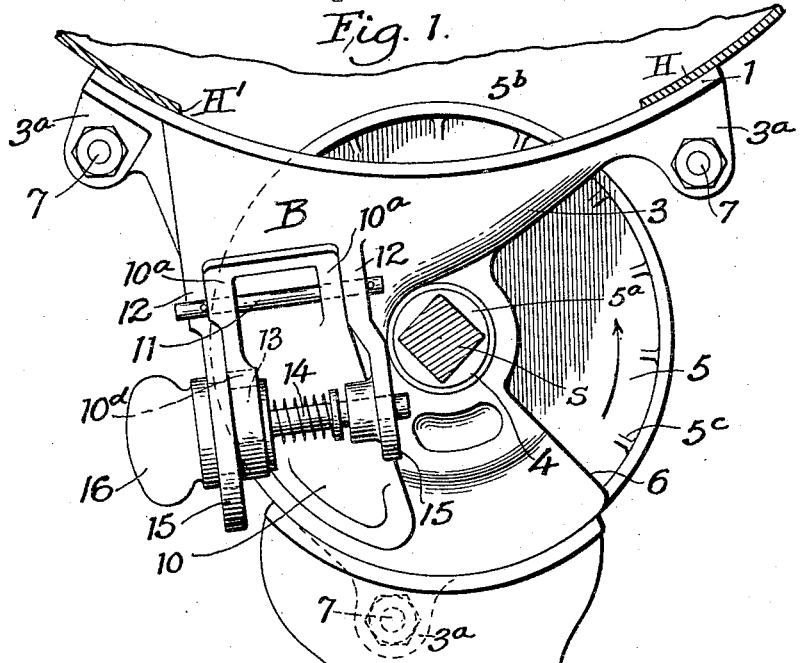
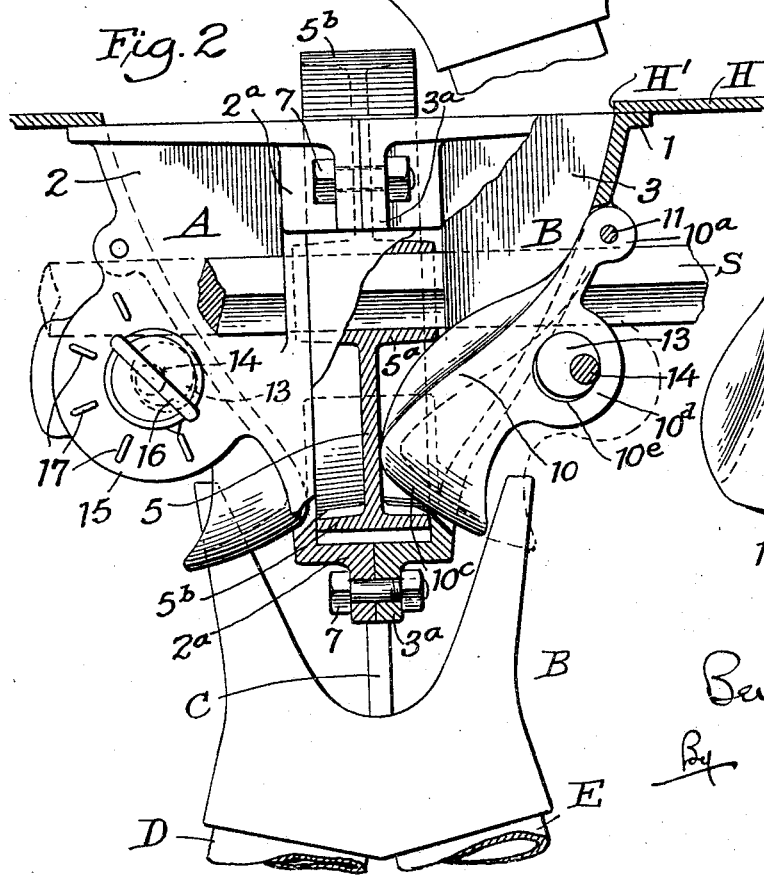
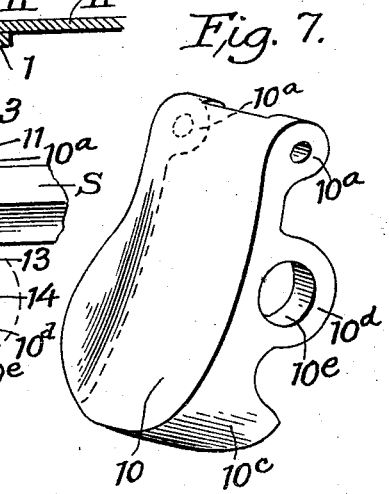
Inventor
Ben P. Johnson
By Alexander F. Powell
Attorneys March 14, 1933.   B. P. JOHNSON   1,901,300
DOUBLE RUN FORCE FEED GRAIN DISTRIBUTOR
Original Filed Feb. 6, 1932   2 Sheets-Sheet 2
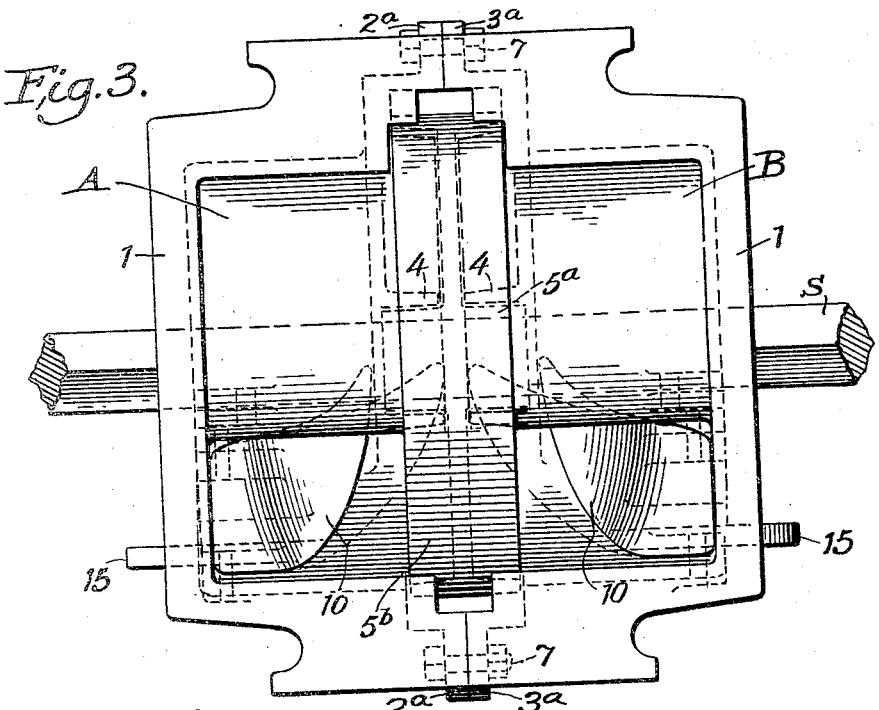
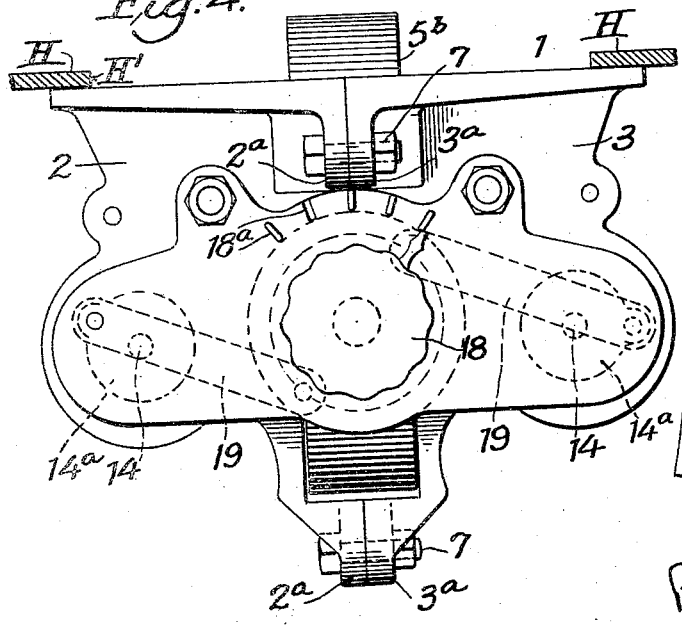
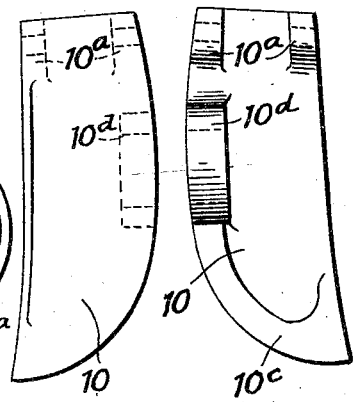

Patented Mar. 14, 1933

1,901,300

UNITED STATES PATENT OFFICE

BEN P. JOHNSON, OF SPRINGFIELD, OHIO, ASSIGNOR TO EDWARD E. GREINER, OF SPRINGFIELD, OHIO

DOUBLE RUN FORCE FEED GRAIN DISTRIBUTOR

Original application filed February 6, 1932, Serial No. 591,407. Divided and this application filed February 6, 1932. Serial No. 591,409.

This invention relates to grain distributors, and the present application is a division of my copending application filed February 6, 1932, Serial No. 591,407. The principal object of the invention is to provide novel double-run adjustable throat force-feed grain distributors for attachment to the feed hoppers of seeding machines or the like, said distributors having a single rotatable feed wheel dividing the interior of the distributor into separate grain compartments, and each face of the wheel operating to independently feed seed behind their individual furrows, whereby I accomplish with one distributor the same results by present practice accomplished with two, my single distributor feeding two furrows.

A further object of the invention is to provide novel grain distributors of the above type with novel independently and simultaneously adjustable throats for regulating the amounts of seed fed to the respective furrows by each side face of the rotatable feed wheel, with means on the outer side of the distributor casing for adjusting and maintaining the throats in adjusted positions.

A still further object of the invention is to provide an indicator pointer and dial to insure accuracy in setting each independently adjustable throat to feed the same amount of feed, as distinguished from the present practice in which all the various distributors are regulated by means of a rod extending between the distributors and operated by means of a lever at the end of the grain hopper, which method is costly to construct and mount, and does not insure an accurate adjustment for each distributor.

Other minor objects of the invention will be hereinafter set forth.

I will explain the invention with reference to the accompanying drawings which illustrate several practical embodiments thereof to enable others familiar with the art to adopt and use the same; and will summarize in the claims, the novel features of construction, and novel combinations of parts, for which protection is desired.

In said drawings:—

Fig. 1 is a side elevation showing my distributor secured to the bottom of a seed hopper, the hopper being shown in section.

Fig. 2 is a front elevation thereof, partly broken away.

Fig. 3 is a top plan view of the distributor, detached.

Fig. 4 is a front elevation of the distributor showing the means for simultaneously operating both adjustable throats with a single knob.

Figs. 5 and 6 are front and rear elevations respectively of the adjustable throat gate, detached.

Fig. 7 is a perspective view of the gate.

As shown in the drawings, my novel distributor preferably comprises a casing adapted to be mounted across an opening H', preferably of general rectangular shape, in the bottom of the feed hopper H, said casing having a flange 1 at its upper end conforming with the curvature of the bottom of the hopper and with the shape of the opening H'. Preferably the casing is made in two complemental and symmetrical halves 2 and 3 bolted together on the centerline of the casing. In each half 2 and 3 of the casing is a bearing 4 adapted to receive a hub 5a of the force feed wheel 5 disposed on the centerline of the casing and dividing the interior of the casing into two separate seed compartments A and B, (Figs. 2 and 3), the compartments being open at the top, the walls thereof conforming with the periphery of the feed wheel 5 and extending down the web of wheel 5 on one side of the hub bearing 4 and below and around the bearing 4 and partly up the wheel 5 at the other side of the bearing, in the usual manner, to the point of discharge 6 (Fig. 1), the walls of each compartment gradually contracting towards the point of discharge 6 adjacent the lower periphery of the wheel 5, whereby grain falling from the hopper H into the seed compartments A and B on each side of the feed wheel 5 will be fed by the portion of the web of the wheel 5 in the respective compartments to the discharge points 6 of the compartments on each side of the wheel. The wheel 5 is preferably provided with a peripheral flange 5b having teeth 5c (Fig. 1) formed on its inner face, at each side of the web, for assisting in forcibly feeding the seed through the compartments A and B as the wheel 5 is rotated in the direction shown by the arrow in Fig. 1 by the drive shaft S which passes through the hub 5a. The flange 5b of the wheel 5 is preferably flush with the periphery of the casing sections 2 and 3 as shown and forms part of the outer wall of the casing, each section 2 and 3 being provided with lugs 2a, 3a, which meet across the flange of the wheel 5, the lugs being held together by bolts 7, and properly spacing the casing sections 2 and 3 with respect to the wheel 5.

In the outer wall of each seed compartment A and B as shown in Figs. 1, 2 and 3, is an adjustable throat, comprising a gate 10 disposed in an opening therefor, each gate 10 forming part of the exterior wall of its compartment, and being hinged at its upper end to the side wall of the casing by means of a pin 11 passing through perforated lugs 10a on the gate and 12 on the casing as indicated in Figs. 1, 5 and 6; the gate curving inwardly and downwardly adapted to engage the web of wheel 5 adjacent its lower periphery, whereby as the gate is swung towards the web of the wheel 5, as in full lines in Fig. 2, the throat of the seed compartments will be narrowed to restrict the amount of seed passing to the point of discharge 6, and whereby as the gate is swung away from the web of wheel 5, as in dotted lines in Fig. 2, the throat will be enlarged to permit a greater amount of seed to pass to the point of discharge 6. At the lower end of each gate 10, on its rear face, is a flange 10c making a close fit within the sides of the opening in the wall of the casing, to prevent seed from escaping from the compartment around the sides of the gate in any position of adjustment of the gate.

On the rear face of each gate is an outwardly projecting lug 10d having an elongated slot 10e (Fig. 2) adapted to receive an eccentric cam 13 mounted upon a shaft 14 journaled in perforated lugs 15 on the sides of the casing sections adjacent the gate 10, said shaft 14 being rotatable by a knob 16 at the front of the casing whereby as the shaft 14 is rotated the gate 10 will be swung towards or away from the web of the wheel 5.

On the front face of the casing, as shown in Fig. 2, are indicating indicia 17 cooperating with the knobs 16 whereby the knobs 16 may be readily set to accurately feed the required amount of seed from the compartments at each side of the wheel 5, the seeds falling into a single throat B (Fig. 2) having a division plate C below the centerline of the wheel 5, to divide the throat B into two compartments feeding seed from the respective compartments through branches D and E to their respective seed furrows. In Fig. 2 the gates 10 are shown as independently adjustable by the use of the separate knobs 16.

In Fig. 4 a modification is shown in which a centrally disposed rotatable knob 18 is mounted on the front face of the casing cooperating with the setting indicia 18a, said knob 18 being connected by links 19 to eccentrics 14a on the shafts 14 controlling the separate gates 10, whereby a single setting of the knob 18 will simultaneously operate both of the gates 10 and maintain the same relative opening or closing movements for each gate 10.

I claim:—

1. In a grain distributor, a casing; a force-feed wheel rotatably mounted in the casing; a grain compartment cooperating with the web of the wheel and contracting towards the points of discharge; an adjustable throat in said compartment forming part of the wall thereof and adjustable towards and away from the web of the wheel to regulate the amount of grain passing through the compartment; and means for adjusting the throat.

2. In a distributor as set forth in claim 1, said throat comprising a gate fitting an opening in the wall of the compartment and hingedly connected to the casing; said gate having a rearwardly extending flange slidably engaging the sides of the opening to prevent grain from falling out of the opening in any adjusted position of the gate.

3. In a distributor as set forth in claim 1, said adjusting means comprising a shaft journaled in lugs at opposite sides of the throat and having a cam thereon; means on the gate cooperating with the cam, a knob on the shaft for rotating the same; and indicia on the casing cooperating with the knob for indicating the setting of the throat.

4. In a grain distributor, a casing; a force-feed wheel rotatably mounted therein and dividing the casing into separate seed compartments, the walls of each compartment narrowing in width towards the points of discharge; an adjustable throat in each compartment forming part of the walls thereof and adjustable towards and away from the web of the wheel to regulate the amount of grain passing through each compartment; and means on the front of the casing for adjusting each throat.

5. In a distributor as set forth in claim 4, each throat comprising a gate fitting an opening in the wall of the compartment and hingedly connected at its upper end to the casing; each gate having a rearwardly extending flange slidably engaging the sides of the opening to prevent grain from falling out of the opening in any adjusted position of the gate.

6. In a distributor as set forth in claim 4, said adjusting means comprising a shaft journaled in lugs at opposite sides of each throat and having a cam thereon; a lug on each gate embracing the cam, a knob on the shaft at the front of the casing for rotating the shaft; and indicia on the casing cooperating with the knob for indicating the setting of the throat.

7. In a distributor as set forth in claim 4, means for simultaneously setting each throat.

8. In a grain distributor, a casing; a force-feed wheel rotatably mounted in the casing and dividing the casing into separate seed compartments disposed at each side of the wheel, said compartments conforming with the periphery of the wheel and narrowing in width towards the points of discharge; an adjustable throat in each compartment forming part of the walls thereof and adjustable towards and away from the web of the wheel to regulate the amount of grain fed through each compartment; and means at the front of the casing for simultaneously setting each throat.

9. In a distributor as set forth in claim 8, each throat comprising a gate fitting an opening in the wall of the compartment opposite the web of the wheel and hingedly connected at its upper end to the casing; each gate having a rearwardly extending flange slidably engaging the sides of the opening for preventing seed from passing through the opening in any adjusted position of the gate.

10. In a grain distributor as set forth in claim 1, said adjusting means comprising a shaft journaled in lugs at opposite sides of each throat and having an eccentric cam thereon; a lug on each gate having an elongated bore receiving the cam, a rotatable knob at the front of the casing; links connecting arms on the knob with arms on each shaft whereby rotation of the knob will rotate each shaft; and indicia on the front of the casing cooperating with the knob for indicating the setting of the throats.

BEN P. JOHNSON.